United States Patent [19]
Sham et al.

[11] Patent Number: 6,100,502
[45] Date of Patent: *Aug. 8, 2000

[54] TOASTER OVEN WITH STEAM

[75] Inventors: John C. K. Sham, Hong Kong, The Hong Kong Special Administrative Region of the People's Republic of China; Kumkit KunavongVorakul, Bangkok, Thailand

[73] Assignee: Wing Shing Products (BVI) Co. Ltd., Aberdeen, The Hong Kong Special Administrative Region of the People's Republic of China

[*] Notice: This patent is subject to a terminal disclaimer.

[21] Appl. No.: 09/181,212

[22] Filed: Oct. 28, 1998

[51] Int. Cl.[7] .................................................... A21B 1/00
[52] U.S. Cl. ............................ 219/401; 126/369; 126/20; 99/467

[58] Field of Search ..................................... 219/401, 444, 219/442, 385; 126/369, 20, 21 A, 369.1, 369.2, 20.1, 20.2; 99/467, 473, 474, 325, 332, 339, 340, 400, 401, 444, 468; 426/510, 523

[56] References Cited

U.S. PATENT DOCUMENTS

| | | | |
|---|---|---|---|
| 3,769,902 | 11/1973 | Hurwitz | 99/472 |
| 4,700,685 | 10/1987 | Miller | 126/20 |
| 5,209,941 | 5/1993 | Wuest | 426/510 |
| 5,680,810 | 10/1997 | Sham | 99/330 |

*Primary Examiner*—Teresa Walberg
*Assistant Examiner*—Shawntia Fuqua
*Attorney, Agent, or Firm*—Salzman & Levy

[57] ABSTRACT

A toaster oven that has a steam generating system is described. The steam from a steam generating system is passed into the oven during the heating and rewarming of meats and casserole dishes to prevent them from drying out.

14 Claims, 2 Drawing Sheets

TOASTER OVEN WITH STEAM

FIELD OF THE INVENTION

The present invention relates to toaster ovens and, more particularly, to a toaster oven having a steam room and a water tank for supplying water to a heating element that converts the water into high pressure steam that is injected into the toaster oven chamber.

BACKGROUND OF THE INVENTION

The toaster oven has become a ubiquitous appliance in the home. The toaster oven is useful for making toast, broiling, and reheating or warming leftovers. Often, however, reheated meats and casserole dishes become dry when reheated. In this condition, the meat or casserole is generally unappetizing.

The present invention features a toaster oven that can be injected with steam during the toasting or broiling cycle. The injected steam is utilized to keep meats and casserole dishes from drying out during reheating.

The toaster oven of the present invention has a water tank that is disposed on the side of the toaster housing, and which is attached to the toaster base. Two knobs are disposed upon the water tank. The first knob can be screwed out of the tank, thus exposing an opening for filling the tank with water. The second knob is used for adjusting the flow of the water from the tank.

The water from the tank passes through an orifice in the bottom of the tank, and into a steam generating enclosure via a water conveying tube. A check valve disposed in the tube controls the flow of water into the steam generating enclosure during a steam generating cycle.

A switch disposed on the front panel of the toaster oven, when actuated, causes a heating element disposed in the steam generating enclosure to begin heating the water. The heated water, in turn, produces pressurized steam. The steam from the enclosure then travels through a tube to a jet which is connected to a steam tube disposed in the wall of the toasting chamber. The pressure of the steam causes the steam to be sprayed into the oven chamber, preventing reheated foods disposed therein from becoming dried out.

SUMMARY OF THE INVENTION

In accordance with the present invention, there is provided a toaster oven that has a steam generating system. The steam from the steam generating system is passed into the oven during the heating and rewarming of meats and casserole dishes to prevent them from drying out. A water tank is disposed on the side of the toaster housing, and attached to the toaster base. Two knobs are disposed upon the water tank. The first knob can be screwed out of the tank, thus exposing an opening for filling the tank with water. The second knob is used for adjusting the flow of the water from the tank.

The water from the tank passes through an orifice in the bottom of the tank, and into a steam generating cavity via a water conveying tube. A check valve disposed in the tube controls the flow of water into the steam generating cavity during a steam generating cycle.

A switch disposed on the front panel of the toaster oven can be actuated to cause a heating element disposed in the steam generating cavity to begin to heat the water. The heated water, in turn, turns into pressurized steam. As the steam is generated, it causes a check valve to close, halting the further flow of water to the steam generating cavity. The generated steam from the cavity then travels through a tube to a jet which is connected to a steam tube disposed in the wall of the oven chamber. The pressure of the steam causes the steam to be sprayed into the oven chamber. As the steam is caused to be sprayed into the oven chamber, the pressure in the steam generating cavity gradually decreases, thus releasing the check valve and allowing the water to reflow into the steam generating cavity for a subsequent steam cycle.

It is an object of this invention to provide an improved toaster oven.

It is another object of the invention to provide a steamer toaster oven.

BRIEF DESCRIPTION OF THE DRAWINGS

A complete understanding of the present invention may be obtained by reference to the accompanying drawings, when considered in conjunction with the subsequent detailed description, in which.

For the purposes of clarity and brevity like elements and components shall bear the same designations and numbering throughout the figures.

DESCRIPTION OF THE PREFERRED EMBODIMENT

Generally speaking, a toaster oven that has a steam generating system is featured herein. The steam from a steam generating system is passed into the oven during the heating and rewarming of meats and casserole dishes to prevent them from drying out.

Figure 1:
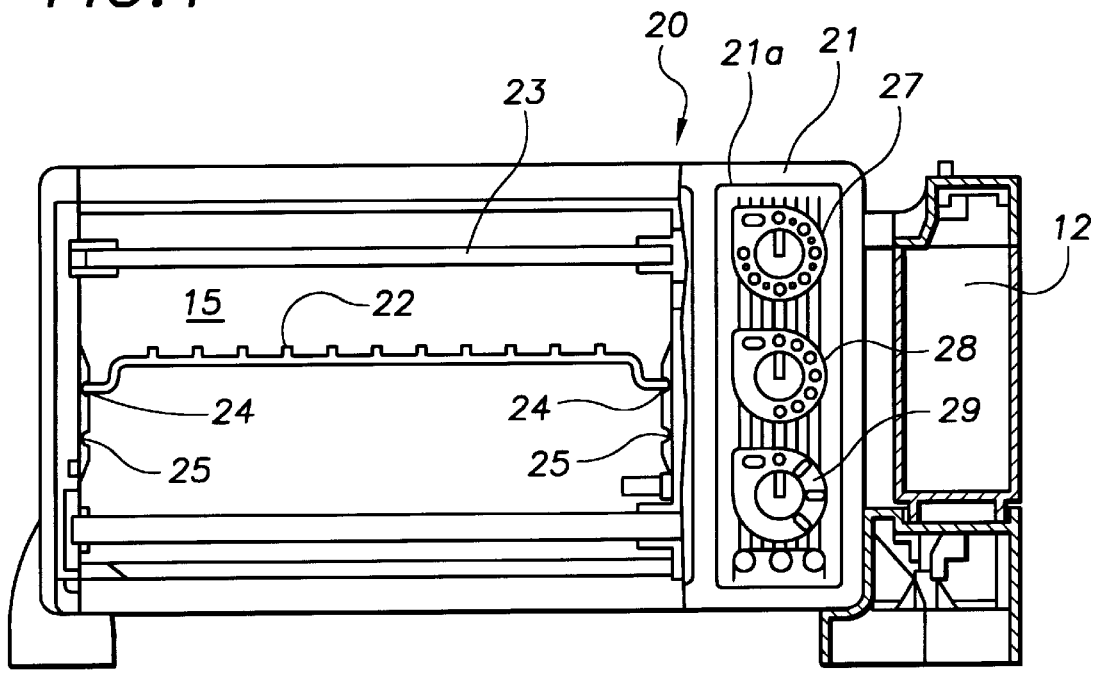
FIG. 1 illustrates a front view of the steamer toaster oven of this invention.
Figure 2:
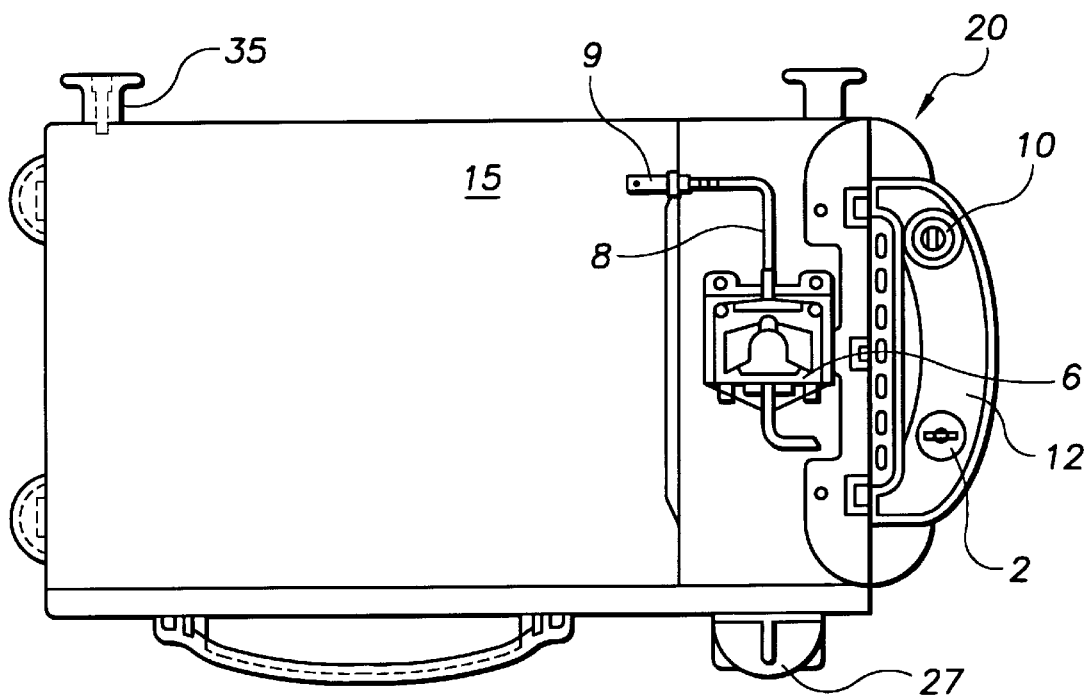
FIG. 2 depicts a top, sectional view of the steamer toaster oven shown in FIG. 1.
Figure 3:
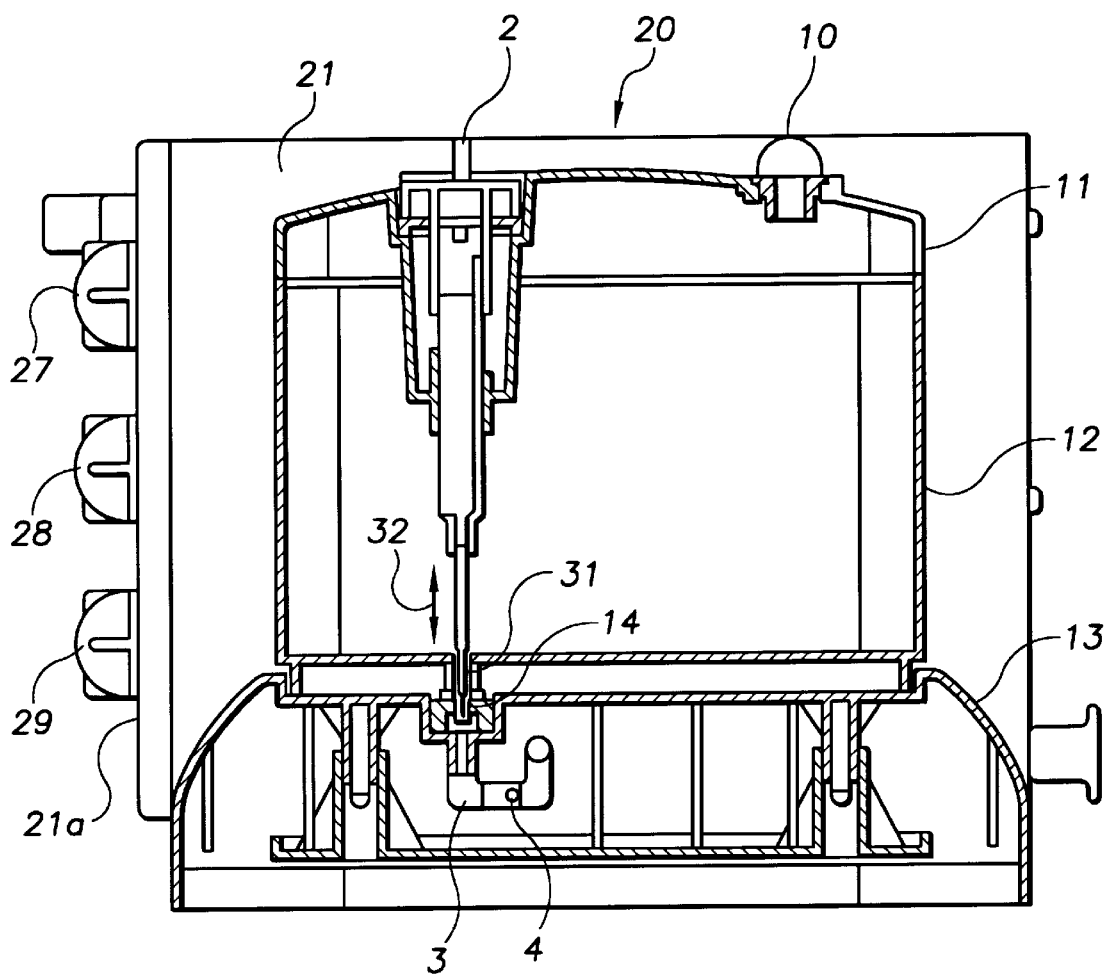
FIG. 3 shows a side, sectional view of the steamer toaster oven illustrated in FIG. 1.

Now referring to FIGS. 1 through 3, a steamer toaster oven 20 is illustrated. The steamer toaster oven 20 comprises a housing 21. The housing 21 contains an oven chamber 15 having heating elements 23 disposed therein, as shown in FIG. 1. A food support rack 22 is shown disposed in side grooves 24. The rack 22 can be slidably disposed in either of the side grooves 24 or 25, respectively. A front control panel 21a has three control knobs 27, 28, and 29 for setting, respectively, the time of the cooking cycle, the temperature for the oven chamber 15, and the cooking mode, such as toast, bake, broil, etc.

A water tank 12 is attached to the toaster oven 20 on the right side thereof. The water tank 12 is supported by a base 13, as best shown in FIG. 3. The water tank 12 has a cover 11 upon which respective knobs 2 and 10 are disposed. Water (not shown) can be poured into, or from, the tank 12 by unscrewing knob 10.

Knob 2 is a water flow adjustment knob. Knob 2 is attached to a needle 31 that projects into a water flow orifice 14 disposed at the bottom of tank 12. When knob 2 is rotated either clockwise or counterclockwise, the needle 31 is caused to move upwardly or downwardly (arrows 32) into, and out of, the orifice 14, as the case may be. The movement of needle 31 effectively narrows, or opens, the orifice 14, so that the flow rate is controlled by turning knob 2.

The water that flows from the orifice 14 empties into a flow tube 3. The water flows from flow tube 3 into a steam generating chamber 7, as depicted in FIG. 2. A check valve 4 (FIG. 3) is disposed in flow tube 3 for controlling the flow of water into the steam generating chamber 7 during steam generation.

A steam generating button 1 disposed on the front control panel 21a can be pressed by an operator to actuate the heating element 6 of the steam generating chamber 7. The water flowing into the steam generating chamber 7 flashes into steam (not shown) when it contacts heating element 6. The pressure of the steam drives the steam through tube 8 (FIG. 2), into oven chamber 15 via a jet nozzle 9 which is connected to a steam tube that enhances the steam distribution inside the chamber. The pressure of the steam simultaneously closes check valve 4.

As the steam fills oven chamber 15, the pressure in the flow tube 8 decreases, causing check valve 4 to reopen and allow more water to flow into the steam generating chamber 7.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A steamer toaster oven, comprising:
   a toaster oven;
   a water tank disposed adjacent said toaster oven;
   a steam generating chamber disposed between said water tank and said toaster oven, said steam generating chamber having a heating element for heating water to become pressurized steam;
   first water conveying means for conveying water from said water tank to said steam generating chamber;
   second water conveying means comprising a let spray nozzle for conveying the pressurized steam generated in said steam generating chamber into said toaster oven; and
   control means operatively connected to said heating element of said steam generating chamber for actuating said heating element to generate said pressurized steam.

2. The steamer toaster oven in accordance with claim 1, further comprising an adjustment knob connected to a control valve supported by said water tank for controlling the flow of water to said steam generating chamber.

3. The steamer toaster oven in accordance with claim 1, further comprising a check valve disposed within said first water conveying means for controlling the flow of water into said steam generating chamber.

4. The steamer toaster oven in accordance with claim 1, further comprising a control panel disposed adjacent said toaster oven, said control panel having means for setting the mode of operation of said steamer toaster oven.

5. The control panel of the steamer toaster oven in accordance with claim 4, further comprising means for setting the time of the mode of operation.

6. The control panel of the steamer toaster oven in accordance with claim 4, further comprising means for setting the temperature of the mode of operation.

7. The control panel of the steamer toaster oven in accordance with claim 5, further comprising means for setting the temperature of the mode of operation.

8. A steamer toaster oven, comprising:
   a housing;
   a toaster oven supported by said housing;
   a water tank disposed adjacent said toaster oven on the side of said housing;
   a steam generating chamber disposed between said water tank and said toaster oven, said steam generating chamber having a heating element for heating water to become pressurized steam;
   first water conveying means for conveying water from said water tank to said steam generating chamber;
   second water conveying means comprising a jet spray nozzle for conveying the pressurized steam generated in said steam generating chamber into said toaster oven; and
   control means operatively connected to said heating element of said steam generating chamber for actuating said heating element to generate pressurized steam.

9. The steamer toaster oven in accordance with claim 8, further comprising an adjustment knob connected to a control valve supported by said water tank for controlling the flow of water to said steam generating chamber.

10. The steamer toaster oven in accordance with claim 8, further comprising a check valve disposed within said first water conveying means for controlling the flow of water into said steam generating chamber.

11. The steamer toaster oven in accordance with claim 8, further comprising a control panel disposed adjacent said toaster oven, said control panel having means for setting the mode of operation of said steamer toaster oven.

12. The control panel of the steamer toaster oven in accordance with claim 11, further comprising means for setting the time of the mode of operation.

13. The control panel of the steamer toaster oven in accordance with claim 11, further comprising means for setting the temperature of the mode of operation.

14. The control panel of the steamer toaster oven in accordance with claim 12, further comprising means for setting the temperature of the mode of operation.

* * * * *